Jan. 4, 1938.   L. G. PONCE   2,104,099
BALL JOINT FOR A REAR VIEW MIRROR
Original Filed Nov. 11, 1936

INVENTOR.
LUCIEN G. PONCE
BY James E. Bradley
ATTORNEY

Patented Jan. 4, 1938

2,104,099

UNITED STATES PATENT OFFICE 2,104,099

BALL JOINT FOR A REAR VIEW MIRROR

Lucien G. Ponce, Follansbee, W. Va., assignor to Liberty Mirror Works, a corporation of Pennsylvania Application November 11, 1936, Serial No. 110,348
Renewed November 26, 1937

4 Claims. (Cl. 287—21)

Figure 1:
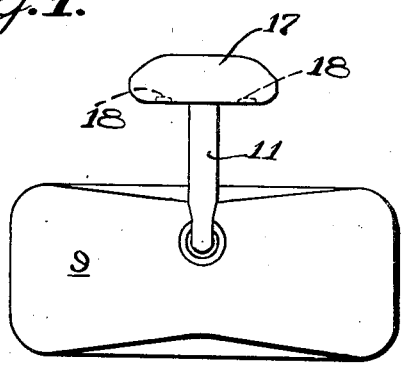
Figure 2:
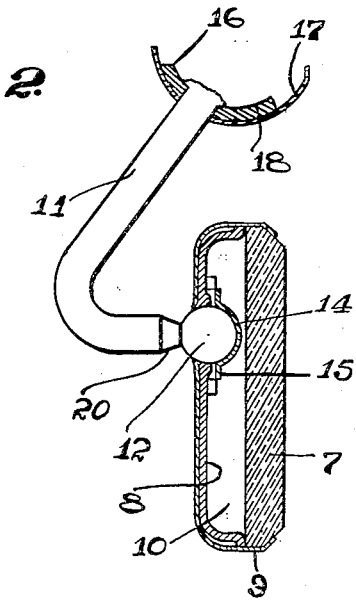
Figure 3:
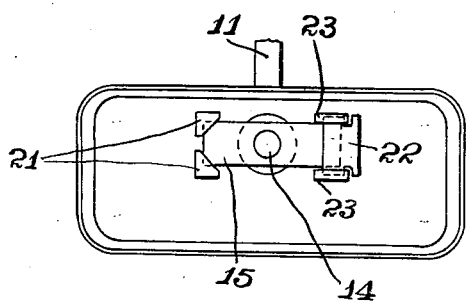
Figure 4:
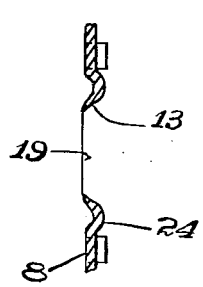
Figures 5, 6:
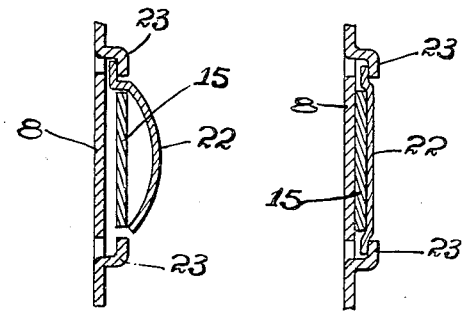
Figure 7:
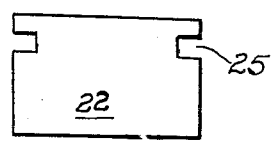

The invention relates to a rear view mirror, and particularly to the ball joint construction, adapting the mirror to adjustment to different angles. The invention has for its primary objects the provision of improved means for anchoring the leaf spring that provides the pressure on the ball (1) which is very cheap and simple; (2) which is secure and easily assembled without the use of rivets or the like; and (3) which permits the spring to adjust itself to the position of the ball to compensate for slight inaccuracies in the position of the anchoring means or variations in the length of the springs. A further object is the provision of an improved means for reinforcing and stiffening the metal of the backing plate which constitutes one side of the ball socket. One embodiment of the invention is shown in the accompanying drawing, wherein:

Figure 1 is a rear elevation of the device. Fig. 2 is an enlarged vertical section at the center of the mirror. Fig. 3 is a front elevation of the device with the glass removed. Fig. 4 is an enlarged fragmentary section through the reinforcing plate at the perforation and the socket for the ball. Figs. 5 and 6 are fragmentary vertical sections through anchoring means for one end of the spring, Fig. 5 showing the parts preliminary to the final assembling step, and Fig. 6 showing the parts after such step. And Fig. 7 is a detail view of one of the parts.

Referring to the drawing, 7 is the glass mirror plate provided on its rear face with a reflective coating protected in the usual way by suitable coatings and a paper sheet or pad which, for clearness of illustration as to other parts, are not shown. Back of the mirror plate, is a sheet metal reinforcing plate 8 having its edges fitting around the edges of the glass plate, as shown. Fitting over the reinforcing plate and having the same contour is the backing plate 9 which is of much lighter material than the reinforcing plate. This plate has its edges rolled around the beveled edges of the glass sheet, thus holding the parts in assembled relation. The reinforcing and backing plates bulge outwardly, as shown in Fig. 2, thus providing a space 10 for the reception of the ball joint.

The assembly is supported from the stud 11 having a ball 12 at its end fitting on one side into a rounded seat 13 (Fig. 4) formed in the reinforcing plate. The other side of the ball fits into a rounded seat 14 in the leaf spring 15. The upper end of the stud 11 is riveted in the reinforcing plate 16 (Fig. 2) mounted in and secured to the shell 17 which is secured to the header bar of the car by means of screws passing through the perforations 18. The ball joint is located well above the longitudinal center line of the mirror, as indicated in Figs. 1 and 2, so that when the mirror is rotated on the ball joint 180 degrees, its vertical position is shifted. To permit this adjustment without making the opening 19 (Fig. 4) too large, the shank of the stud 11 is cut away or beveled as indicated at 20 in Fig. 2.

The leaf spring is secured to the reinforcing plate 8 at one end by means of the triangular lugs 21 which are struck up from the body of the plate forming pockets for receiving the corners of the spring. The other end of the spring lies beneath a strap 22 of sheet metal whose ends lie beneath the ends of the lugs 23 which are also struck up from the body of the reinforcing plate. In assembling the spring with respect to the ball and the plate 8, the spring is placed over the ball with one end in engagement with the lugs 21 and the other end pressed down to the position of Fig. 5. The strap 22 having the curved shape shown in such figure is then placed in position and pressure is applied on the curved portion of the strap by a press which flattens out the strap and brings the parts to the position shown in Fig. 6. The strap is notched as indicated at 25 in Fig. 7 and the notches engage the end walls of the lugs 23. This positively centers the strap in the direction of its length, so that when pressed down into holding position each end will underlie the lugs 23, 23 the same amount. Without this expedient, the strap is sometimes pushed down from the position of Fig. 5 so that one end passes through one of the perforations beneath a lug 23 and dinges or distorts the thin backing plate 9. This provides a very cheap, simple means for securing the spring to the reinforcing plate without the use of rivets or the like, and leaves the spring free for limited endwise and lateral movement so that it can adjust itself to the position of the ball 12. The holding means do not, therefore, require the exactitude of position which would otherwise be the case, and the springs may vary slightly in length without interfering with the proper functioning of the assembly.

As indicated in Fig. 4, a rib 24 of annular form surrounding the seat 19 is punched into the material. This expedient stiffens and reinforces the plate 8 at the point subject to the strain of supporting the ball under the pressure of the leaf spring. As a result, the ball seat is stiffer and less yielding than would otherwise be the case.

It follows that the reinforcing plate 8 may be made of somewhat thinner metal than would be the case if the expedient of providing the annular rib were not employed.

As illustrated in Fig. 2, the mirror is shown at one extreme of adjustment. In service, it is adjusted clockwise around the ball until the mirror plate is approximately parallel to the body portion of the post. When in this position, a bodily elevation of the mirror is possible by turning the mirror in its own plane through an angle of 180 degrees as heretofore pointed out, which adjustment will elevate the mirror about one inch.

What I claim is:

1. In combination in a ball joint for a rear view mirror, a sheet metal plate having a perforation therethrough surrounded on one side of the plate with a ball seat, a ball stud extending through the perforation and comprising a stem with a ball at its inner end which engages the seat, a leaf spring forward of the ball for applying pressure thereon, and means for securing the spring to the metal plate comprising a pair of triangular lugs struck up from the metal plate at one end of the spring and forming pockets which receive the corners of the spring at such end, a second pair of lugs struck up from the metal plate at the other end of the spring forming pockets, and a sheet metal strap lying above such last end of the spring with its ends in such last pockets.

2. In combination in a ball joint for a rear view mirror, a sheet metal plate having a perforation therethrough surrounded on one side of the plate with a ball seat, a ball stud extending through the perforation and comprising a stem with a ball at its inner end which engages the seat, a leaf spring forward of the ball for applying pressure thereon, and means for securing the spring to the metal plate comprising socket means struck up from the metal plate at one end of the spring to receive such end, a pair of parallel lugs struck up from the metal plate at the other end of the spring forming pockets, and a sheet metal strap lying above said last end of the spring with its ends in such pockets.

3. In combination in a ball joint for a rear view mirror, a sheet metal plate having a perforation therethrough surrounded on one side of the plate with a ball seat, a ball stud extending through the perforation and comprising a stem with a ball at its inner end which engages the seat, a leaf spring forward of the ball for applying pressure thereon, and means for securing the spring to the metal plate comprising socket means formed in the metal plate at one end of the spring receiving such end and preventing lateral movement of the spring and also endwise movement in a direction away from the ball, socket means formed in the metal plate at the other end of the spring and a metal strap carried thereby and overlying such last end of the spring and permitting endwise movement of the spring relative thereto.

4. In combination in a ball joint for a rear view mirror, a sheet metal plate having a perforation therethrough surrounded on one side of the plate with a ball seat, a ball stud extending through the perforation and comprising a stem with a ball at its inner end which engages the seat, a leaf spring forward of the ball for applying pressure thereon, and means for securing the spring to the metal plate comprising socket means struck up from the metal plate at one end of the spring to receive such end, a pair of parallel lugs struck up from the metal plate at the other end of the spring forming pockets, and a sheet metal strap having its ends notched with such notches engaging the end walls of the lugs so that a portion of each end of the strap lies beneath one of the lugs.

LUCIEN G. PONCE.